US011757823B2

(12) United States Patent
Yan et al.

(10) Patent No.: US 11,757,823 B2
(45) Date of Patent: Sep. 12, 2023

(54) ELECTRONIC MAIL AUTHENTICATION AND TRACKING IN DATABASE SYSTEM

(71) Applicant: Salesforce, Inc., San Francisco, CA (US)

(72) Inventors: Minhui Yan, San Francisco, CA (US); Abhijit Bare, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/408,265

(22) Filed: Aug. 20, 2021

(65) Prior Publication Data
US 2023/0053692 A1 Feb. 23, 2023

(51) Int. Cl.
*H04L 51/56* (2022.01)
*H04L 51/08* (2022.01)
*H04L 9/40* (2022.01)
*H04L 51/42* (2022.01)

(52) U.S. Cl.
CPC .............. *H04L 51/56* (2022.05); *H04L 51/08* (2013.01); *H04L 51/42* (2022.05); *H04L 63/0428* (2013.01)

(58) Field of Classification Search
CPC ......... H04L 51/56; H04L 51/08; H04L 51/42; H04L 63/0428
See application file for complete search history.

(56) References Cited

U.S. PATENT DOCUMENTS

| | | | | |
|---|---|---|---|---|
| 7,308,477 B1* | 12/2007 | Gress | ................. | H04L 63/0428 |
| | | | | 379/279 |
| 8,090,940 B1* | 1/2012 | Fenton | ................. | H04L 51/212 |
| | | | | 713/160 |
| 10,044,662 B1* | 8/2018 | Mesters | ................ | H04L 51/216 |
| 10,509,843 B2* | 12/2019 | Bare | ................. | G06F 16/9566 |
| 10,742,586 B2* | 8/2020 | Brown | ................... | H04L 63/20 |
| 10,771,418 B2* | 9/2020 | Sachtjen | ................ | H04L 51/04 |
| 11,329,997 B2* | 5/2022 | Goldstein | ............. | H04L 63/126 |
| 2003/0065917 A1* | 4/2003 | Medvinsky | ......... | H04L 65/1101 |
| | | | | 713/160 |
| 2005/0004978 A1* | 1/2005 | Reed | ........................ | H04L 9/40 |
| | | | | 705/26.1 |

(Continued)

*Primary Examiner* — Jimmy H Tran
(74) *Attorney, Agent, or Firm* — Kwan & Olynick LLP

(57) ABSTRACT

Disclosed are some implementations of systems, apparatus, methods and computer program products for tracking inbound email messages in association with database records. A first electronic mail message received via a network from a first client device is processed, where the first electronic mail message has a header including a message identifier. The message identifier is obtained from the header and parsed such that an encrypted portion and one or more unencrypted portions are obtained, where a first unencrypted portion of the unencrypted portions includes an entity identifier associated with a first database record of a database. A secret key associated with the first electronic mail message is obtained and the first electronic mail message is authenticated using the secret key, the encrypted portion of the message identifier, and at least one unencrypted portion of the unencrypted portions of the message identifier. The first electronic mail message is stored in association with the first database record according to a result of authenticating the first electronic mail message.

20 Claims, 10 Drawing Sheets

(56) References Cited

U.S. PATENT DOCUMENTS

| | | | |
|---|---|---|---|
| 2005/0044412 A1* | 2/2005 | Bishop, Jr. | G06Q 40/04 726/4 |
| 2005/0198170 A1* | 9/2005 | LeMay | H04L 63/045 709/206 |
| 2006/0285692 A1* | 12/2006 | Kerstens | H04W 12/08 380/270 |
| 2007/0127784 A1* | 6/2007 | Taylor | H04L 51/212 715/810 |
| 2007/0168436 A1* | 7/2007 | Andam | G06Q 10/107 709/206 |
| 2008/0031458 A1* | 2/2008 | Raja | H04L 51/00 380/279 |
| 2010/0046757 A1* | 2/2010 | Dancer | H04L 63/045 713/168 |
| 2011/0258446 A1* | 10/2011 | Brown | H04L 9/3247 713/168 |
| 2012/0216040 A1* | 8/2012 | Tanamy | H04L 63/102 713/170 |
| 2013/0166914 A1* | 6/2013 | Vandervort | H04L 63/123 713/176 |
| 2013/0191402 A1* | 7/2013 | Wilkins | H04L 9/08 707/752 |
| 2013/0238518 A1* | 9/2013 | Miller | H04L 63/14 705/325 |
| 2014/0013104 A1* | 1/2014 | Vinnik | H04L 63/123 713/150 |
| 2014/0215490 A1* | 7/2014 | Mathur | G16H 10/60 719/313 |
| 2014/0222933 A1* | 8/2014 | Stovicek | H04M 1/7243 709/206 |
| 2015/0033141 A1* | 1/2015 | Mishra | H04L 51/42 715/752 |
| 2015/0121075 A1* | 4/2015 | Harjanto | H04L 63/0428 713/170 |
| 2015/0180845 A1* | 6/2015 | Uomini | H04L 63/083 726/3 |
| 2015/0381587 A1* | 12/2015 | Scharf | G06F 21/6218 713/165 |
| 2016/0147782 A1* | 5/2016 | Roseman | G06F 16/25 707/822 |
| 2016/0212082 A1* | 7/2016 | Bhavnani | H04L 51/216 |
| 2016/0217454 A1* | 7/2016 | Killoran, Jr. | G06Q 10/107 |
| 2016/0269440 A1* | 9/2016 | Hartman | H04L 51/42 |
| 2017/0318160 A1* | 11/2017 | Hamilton | H04L 51/48 |
| 2018/0295153 A1* | 10/2018 | Eisen | H04L 63/0236 |
| 2019/0087595 A1* | 3/2019 | Czajkowski | H04L 63/0442 |
| 2019/0173859 A1* | 6/2019 | Nejadian | H04L 9/083 |
| 2019/0238494 A1* | 8/2019 | LeVasseur | H04L 63/12 |
| 2019/0253244 A1* | 8/2019 | Hamel | H04L 9/14 |
| 2020/0036730 A1* | 1/2020 | Seshadri | H04L 63/123 |
| 2020/0092257 A1* | 3/2020 | Goldstein | H04L 63/1483 |
| 2020/0125747 A1* | 4/2020 | Hamel | H04L 9/3247 |
| 2020/0137081 A1* | 4/2020 | Goldstein | H04L 63/0823 |
| 2020/0244614 A1* | 7/2020 | Tomkow | H04L 63/126 |
| 2020/0259806 A1* | 8/2020 | Baudoin | H04L 9/0819 |
| 2020/0296082 A1* | 9/2020 | Killoran, Jr. | G06Q 20/4014 |
| 2020/0344222 A1* | 10/2020 | Manges | H04L 9/0816 |
| 2020/0372470 A1* | 11/2020 | Aboel-Nil | G06Q 10/107 |
| 2021/0105589 A1* | 4/2021 | Kassemi | H04L 65/40 |
| 2021/0211410 A1* | 7/2021 | Everton | H04L 63/0245 |
| 2021/0211462 A1* | 7/2021 | Birch | H04L 63/0236 |
| 2021/0409424 A1* | 12/2021 | Seshadri | H04L 9/3236 |
| 2022/0014383 A1* | 1/2022 | Duncan | H04L 9/3247 |
| 2022/0086133 A1* | 3/2022 | Killoran, Jr. | H04L 63/08 |
| 2022/0101303 A1* | 3/2022 | Killoran, Jr. | G06Q 20/3255 |
| 2022/0103501 A1* | 3/2022 | Tyler | H04L 51/216 |
| 2022/0109657 A1* | 4/2022 | Munde | H04L 63/061 |
| 2022/0156369 A1* | 5/2022 | Narayanaswamy | H04L 9/0872 713/168 |
| 2022/0263822 A1* | 8/2022 | Zager | H04L 63/126 |
| 2022/0321520 A1* | 10/2022 | Kras | H04L 69/22 |
| 2023/0070202 A1* | 3/2023 | Kras | H04L 51/08 |

\* cited by examiner

ELECTRONIC MAIL AUTHENTICATION AND TRACKING IN DATABASE SYSTEM

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with electronic message processing. More specifically, this patent document discloses techniques for tracking electronic messages in association with database records.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, electronic mail (email) systems, and instant messaging systems, by way of example, in a cloud computing environment.

Email systems enable messages to be exchanged between users using electronic devices. This typically involves transmitting messages over communication networks. Recipients of email messages may access their email messages via a mail box.

BRIEF DESCRIPTION OF THE DRAWINGS

The included drawings are for illustrative purposes and serve only to provide examples of possible structures and operations for the disclosed systems, apparatus, methods and computer program products for tracking electronic mail (email) messages in association with database records. These drawings in no way limit any changes in form and detail that may be made by one skilled in the art without departing from the spirit and scope of the disclosed implementations.

DETAILED DESCRIPTION

Figure 1:
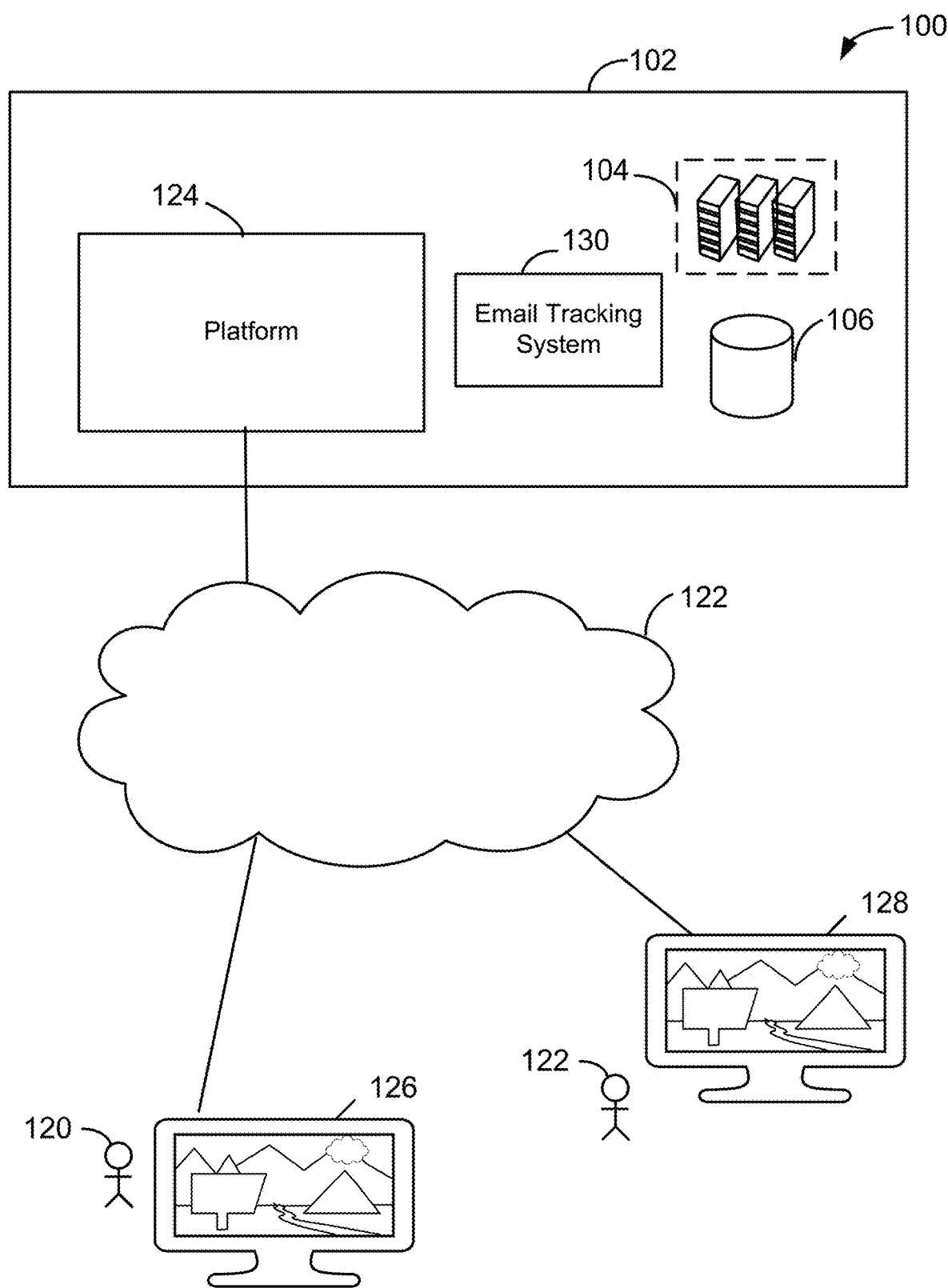
FIG. 1 shows a system diagram of an example of a system 100 in which electronic mail (email) messages may be tracked, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for tracking electronic mail (email) messages in association with database records. These techniques facilitate tracking inbound email messages received in response to outbound email messages transmitted in association with database records of a database system.

In many organizations, database systems are implemented to store customer data pertaining to entity records such as contacts, leads, cases, etc. For example, data pertaining to a case such as a customer support case may be stored in a corresponding database record of a database system. Often, organizations leverage Customer Relationship Management (CRM) systems to facilitate the management of customer data that may be received or derived from various channels such as telephone, email, live chat, marketing materials, and social media.

In some systems, when an outbound email message pertaining to an entity record is transmitted from an organization to a customer, a reference identifier (ID) corresponding to an entity record is generated and provided in a "Subject" field of the outbound email message. When a client device responds to the outbound email message, the client device copies the reference ID into a reply email message and transmits the reply email message to the organization. The organization's computing system or a customer service representative employed by the organization may then use the reference ID to identify the entity record that is pertinent to the reply email message. Unfortunately, the reference ID can be guessed by potential hackers. Therefore, the implementation of a reference ID in the subject field of an email presents an undesirable security issue.

In addition, there are additional drawbacks to the transmission of a reference ID in the subject field of an email. More particularly, a reference ID cannot be used to authenticate an inbound email, further compromising the security of organizational data.

In accordance with various implementations, techniques are disclosed for tracking email messages pertaining to database records using message identifiers. In some implementations, a message identifier is generated for an outbound email message, where the message identifier includes one or more unencrypted portions and an encrypted portion, where the unencrypted portions include an entity identifier associated with a corresponding database record, which may also be referred to as an entity record. The message identifier is provided in at least one header of the outbound email message and the outbound email message is transmitted to a recipient. For example, the message identifier may be provided in a Message-ID header of the outbound email message.

In some implementations, techniques are disclosed for generating a message identifier used to track email messages pertaining to a database record. A secret key associated with an outbound email message pertaining to a database record is obtained. The secret key is then applied to encrypt a set of one or more items pertaining to the outbound email message such that an encrypted portion is generated. The set of items can include, but are not limited to, one or more of: an entity identifier associated with the database record, an organization identifier, a key identifier, and/or a randomly generated string. A message identifier including the encrypted portion and one or more unencrypted portions is generated, where the unencrypted portions include the entity identifier associated with the database record. In some implementations, the unencrypted portions further include, but are not limited to, the organization identifier and/or key identifier.

In some implementations, techniques are disclosed for processing an inbound email message received from a client device. A message identifier is obtained from a header of the inbound email message. For example, the header can include an In-Reply-To header and/or a References header. The message ID is parsed such that an encrypted portion and one or more unencrypted portions are obtained, where a first unencrypted portion includes an entity identifier associated with a database record. A secret key associated with the inbound email message is obtained from a key repository. The inbound email message is authenticated using the secret key, the encrypted portion, and at least one unencrypted portion. The inbound email message is stored in association with the database record according to a result of authenticating the inbound email message.

By way of illustration, an organization, Acme Construction, Inc., implements an automated case closure process that transmits an automated email to a user of the system after a case initiated by the user has been inactive for a period of 60 days. Upon generation of an automated email addressed to Steven notifying him of closure of a case initiated by Steven, a message identifier is generated and provided in a Message Identifier header of the email. The email including the message identifier is then transmitted to Steven.

Upon receipt of the email, Steven is surprised to see that the case has been closed since the issue that prompted opening the case has not been resolved. Steven replies to the email. In the reply email message, Steven requests that someone contact him regarding the case. The client device automatically copies the message identifier to a header of the reply email message and transmits the reply email message.

Upon receipt of the reply email message, the message identifier is obtained from the header of the reply email message, parsed, and processed to authenticate the reply email message. Upon successful authentication, the system stores the reply email message in association with a database record corresponding to a case identified by an entity identifier in an unencrypted portion of the message identifier.

FIG. 1 shows a system diagram of an example of a system 100 in which electronic mail (email) messages may be tracked, in accordance with some implementations. Database system 102 includes a variety of different hardware and/or software components that are in communication with each other. In the non-limiting example of FIG. 1, system 102 includes any number of computing devices such as servers 104, which may include one or more email servers. Servers 104 are in communication with one or more storage mediums 106 configured to store and maintain relevant metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can store emails in databases, which may be updated and accessed as described in further detail below. In some implementations, storage mediums 106 can include a CRM database in which database records corresponding to entity identifiers may be stored.

In some implementations, system 102 is configured to store user profiles/user accounts associated with users of system 102. Information maintained in a user account (e.g., email account) of a user can include or indicate a user email address and credentials of the user. For example, credentials of the user can include a username and password.

Client devices 126, 128 may be in communication with system 102 via network 122. More particularly, client devices 126, 128 may communicate with servers 104 via network 122. For example, network 122 can be the Internet. In another example, network 122 comprises one or more local area networks (LAN) in communication with one or more wide area networks (WAN) such as the Internet.

Embodiments described herein are often implemented in a cloud computing environment, in which network 122, servers 104, and possible additional apparatus and systems such as multi-tenant databases may all be considered part of the "cloud." Servers 104 may be associated with a network domain, such as www.salesforce.com and may be controlled by a data provider associated with the network domain. A user of client computing device 126 can have an account at Salesforce.com®. By logging into this account, the user can access the various messaging services provided by servers 104. Messaging services may also be accessed via an application installed on a client device.

In some implementations, users 120, 122 of client devices 126, 128 can access email services by logging into system 102 via platform 124. More particularly, client devices 126, 128 can log into system 102 via an application programming interface (API) or via a graphical user interface (GUI) using credentials of corresponding users 120, 122, respectively. Email services can include, for example, generating, transmitting, opening email messages, and accessing email event status information.

Users 120, 122 can send and/or receive emails transmitted between client devices 126, 128. In addition, users 120, 122 can receive emails that are auto-generated by system 102. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, system 102 includes an email tracking system 130 that facilitates tracking of inbound emails that pertain to database records of database(s) of storage mediums 106. Tracking may be performed on a global basis, for specific organizations, or for a subset of inbound emails, as will be described in further detail below. For example, tracking may be performed for specific tenant(s) of a multi-tenant database.

In some implementations, tracking is performed for reply emails transmitted in response to system emails that are automatically generated by system 102. In other implementations, tracking is performed for reply emails transmitted in response to user-generated emails originating from employees of system 102. For example, tracking may be performed for reply emails transmitted in response to emails originating from employees in the customer service department of system 102.

In this example, user 120 of client device 126 is a customer service representative. User 120 may generate and send an outbound email pertaining to an entity record such as a case to user 122 of client device 128. Alternatively, system 102 may generate and send an automated outbound email pertaining to an entity record to user 122. User 122 then generates and sends a reply email pertaining to the case. Email tracking system 130 processes the outbound email and subsequent reply email, as will be described in further detail below-. The reply email can be stored in association with a database record corresponding to the case according to a result of authentication of the reply email, as described herein. Communication among components of system 102 may be facilitated through a combination of networks and interfaces.

Figure 2:
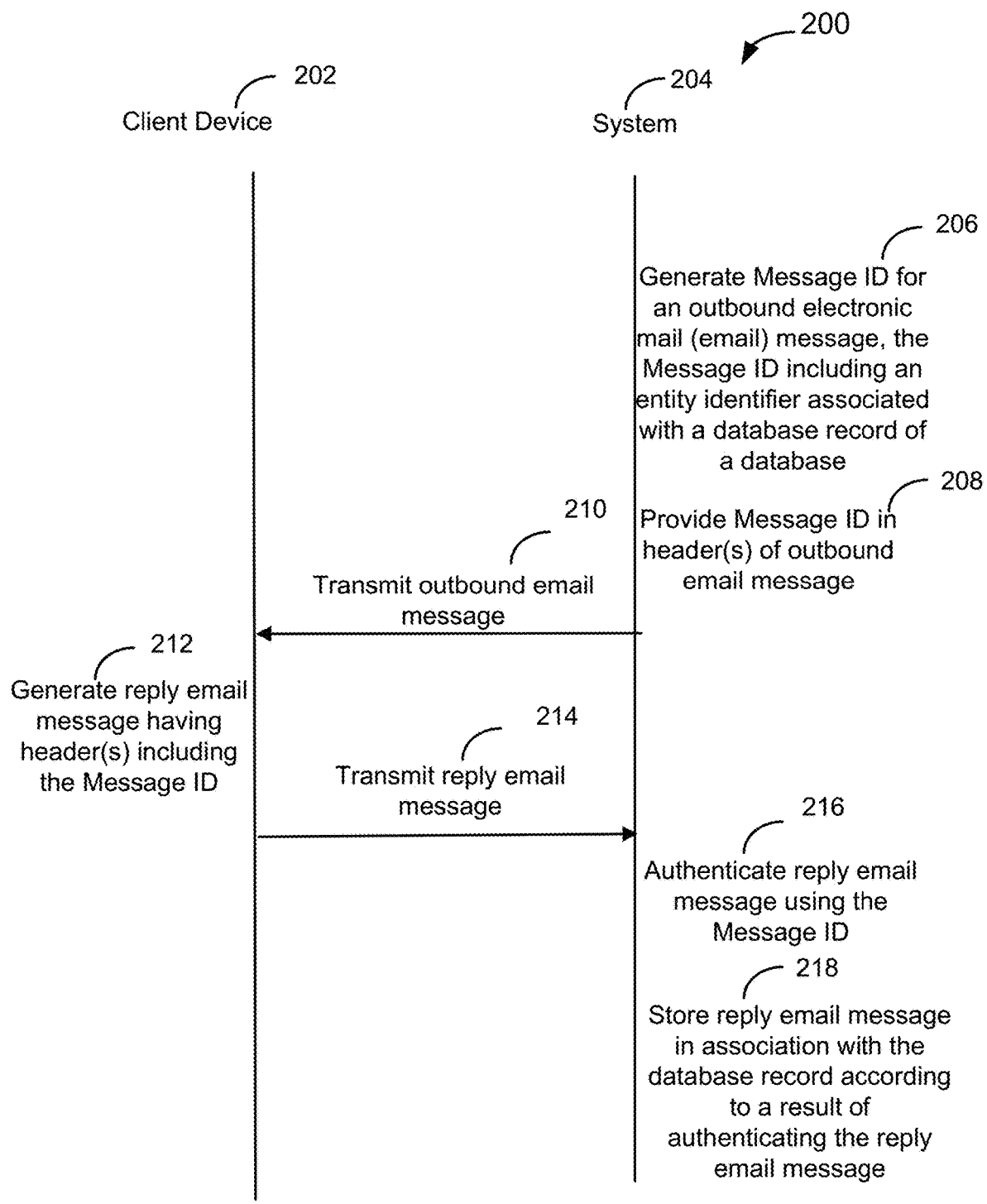
FIG. 2 shows a transaction flow diagram 200 illustrating an example of a process for tracking email messages in association with database records.

FIG. 2 shows a transaction flow diagram 200 illustrating an example of a process for tracking email messages in association with database records. Operations performed by a client device and email tracking system 130 are represented by vertical lines 202, 204, respectively. As shown in this example, an outbound email message is generated via system 204. The outbound email message may be composed by a user of email tracking system 130 or may be automatically generated via a system component of system 102. For example, a user of email tracking system 130 may compose the outbound email message via another client device (not shown to simplify illustration). In some implementations, email tracking system 130 receives, intercepts, or otherwise obtains the outbound email message prior to its transmission to the addressee of the outbound email message.

Email tracking system 130 generates a message identifier for the outbound email message at 206, where the message identifier includes an entity identifier associated with a database record of a database. More particularly, email tracking system 130 can generate the message identifier responsive to determining that the outbound email message has been generated. Alternatively, email tracking system 130 can generate the message identifier responsive to a request to transmit the outbound email message. In some implementations, the message identifier may be generated by a system component that intercepts the outbound email message after it has been transmitted.

To generate the message identifier, email tracking system 130 obtains a secret key associated with the outbound email message. The secret key may be applied to a set of one or more items associated with the outbound email message to generate an encrypted portion of the message identifier. The message identifier includes one or more unencrypted portions and the encrypted portion. The unencrypted portions can include the set of items used to generate the encrypted portion. More particularly, the unencrypted portions can include the entity identifier associated with the outbound email message. In addition, the unencrypted portions can include additional items such as an organization identifier, a key identifier associated with the secret key, and/or a string, which may be randomly generated. The items used to generate the encrypted portion of the message identifier can include one or more items in at least one unencrypted portion. For example, the encrypted portion of the message identifier can be generated by applying the secret key to one or more of: the entity identifier, the key identifier, the organization identifier, or a string that has been generated by email tracking system 130.

Email tracking system 130 provides the message identifier in one or more message headers of the outbound email message at 208. The outbound email message is then transmitted to the intended recipient at 210. Email tracking system 130 may transmit the outbound email message via an email server (not shown to simplify illustration).

Upon receiving the outbound email message, a user of client device 202 may choose to compose a reply email message at 212. Client device 202 copies the message identifier from the outbound email message to the message header(s) of the reply email message, as described herein. Responsive to the user initiating the sending of the reply email message, client device 202 transmits the reply email message at 214 to the sender of the outbound email message.

Email tracking system 130 may receive the reply email message via an email server. Email tracking system 130 obtains the message identifier from a message header of the reply email message and authenticates the reply email message using the message identifier at 216. More particularly, email tracking system 130 can obtain a secret key associated with the reply email message and authenticate the reply email message using the message identifier and secret key. System 102 can then save the reply email message in association with the database record according to a result of the authentication at 218. Specifically, if the reply email message is successfully authenticated, the reply email message may be saved in association with the database record.

If the reply email message is not successfully authenticated, the reply email message may be processed in a number of ways. In some instances, the system may determine that there is a possibility or likelihood that the reply email message is still authentic. In these situations, the system can create a new entity database record and store the reply email message in association with the new entity database record. In other instances, the system may conclude that the reply email message is a forged email or has a high probability of being a forged email. In these instances, the system may choose to discard the reply email message.

In some implementations, the system transmits a notification message of failed authentication to one or more individuals such as a system administrator. For example, the system may generate and transmit a notification message that provides a system administrator with the reply email message, a link to the reply email message, information from the reply email message (e.g., source email address), or information identifying the newly created database record. The system administrator may then choose to further investigate the forged email or review the newly created database record, as appropriate.

Figure 3A:
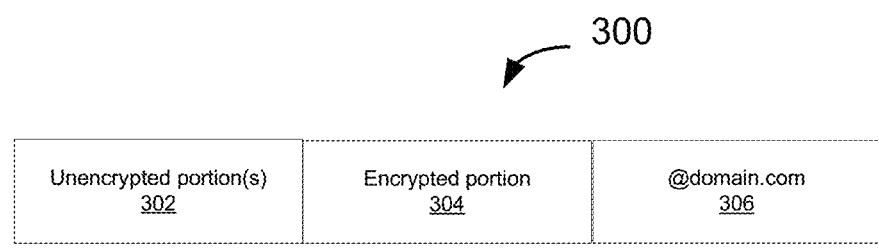
FIG. 3A shows a diagram illustrating an example format of a system generated message identifier 300 that can be used to track email messages in association with database records, in accordance with some implementations.

FIG. 3A shows a diagram illustrating an example format of a system generated message identifier 300 that can be used to track email messages in association with database records, in accordance with some implementations. As shown in this example, message identifier 300 includes one or more unencrypted portions 302 and at least one encrypted portion 304. In some implementations, unencrypted portions 302 may be a predefined length. Similarly, the encrypted portion 304 may be a predefined length. Alternatively, unencrypted portions 302 and/or encrypted portion 304 may be of variable lengths. Final portion 306 of message identifier 300 includes an "@" symbol followed by a domain identifier.

Figure 3B:
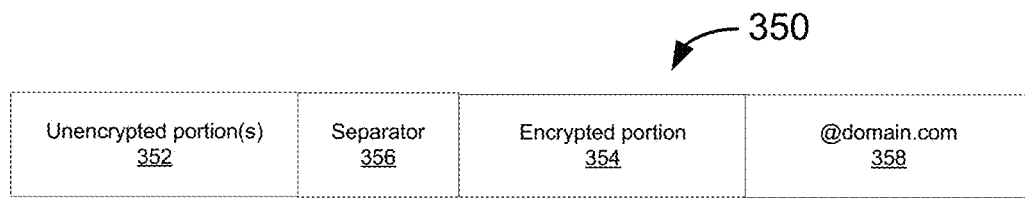
FIG. 3B shows a diagram illustrating another example format of a system generated message identifier 350 that can be used to track email messages in association with database records, in accordance with some implementations.

In other implementations, a set of characters delineates the encrypted portion from the unencrypted portions. FIG. 3B shows a diagram illustrating another example format of a system generated message identifier 350 that can be used to track email messages in association with database records, in accordance with some implementations. In this example, unencrypted portions 352 and encrypted portion 354 are separated by a delineator 356. For example, delineator 356 can include a special character such as \, /, [,], * &, #, or $. Final portion 358 of message identifier 350 includes an "@" symbol followed by a domain identifier.

In the above examples, the unencrypted portions are in a first segment of the message identifier. However, this example is merely illustrative. Therefore, unencrypted portions and encrypted portion of the message identifier may be provided in any order within the message identifier.

Figure 4:
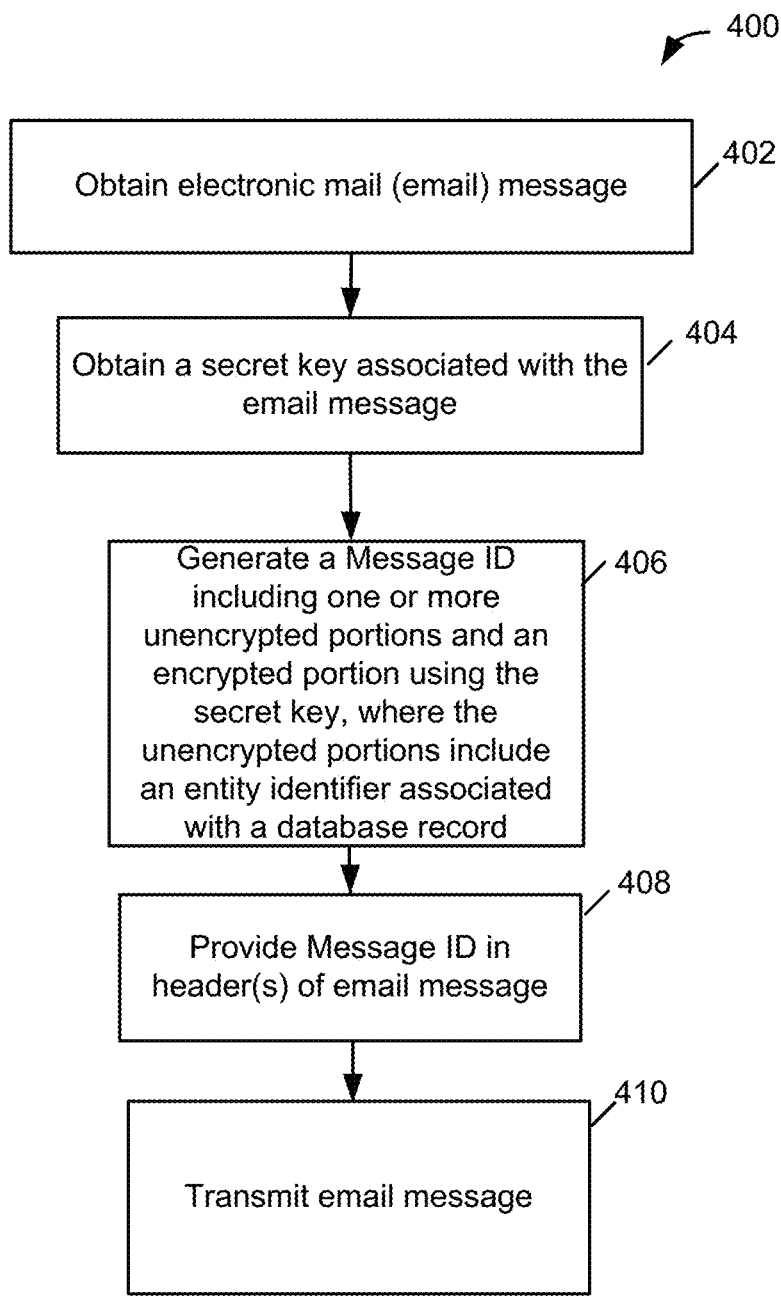
FIG. 4 shows a process flow diagram 400 illustrating an example of a method for processing outbound email messages, in accordance with some implementations.

FIG. 4 shows a process flow diagram 400 illustrating an example of a method for processing outbound email messages, in accordance with some implementations. The system obtains an outbound email message associated with a database record at 402, where the database record is identified by or otherwise associated with an entity identifier. For example, the outbound email message may be associated with a particular case identifier. The system obtains a secret key associated with the outbound email message at 404. In some implementations, the system may retrieve the secret key from a repository of secret keys. For example, the system may ascertain an organization identifier of an organization via which the outbound email message is generated. Thus, the system may look up the organization identifier to retrieve a corresponding secret key. In some implementations, the system may periodically rotate among two or more secret keys associated with the organization identifier, thereby increasing the security of the message identifier.

Where an organization has two or more secret keys associated therewith, a secret key may be further identified by a corresponding key identifier.

In other implementations, the system may dynamically generate a secret key for the outbound email message. The system may subsequently store the secret key in a key repository in association with an identifier such as the organization identifier and/or key identifier.

The system generates a message identifier including one or more unencrypted portions and an encrypted portion using the secret key at 406, where the unencrypted portions include an entity identifier associated with a database record. The unencrypted portions of the message identifier can further include the organization identifier and/or a key identifier. In addition, the unencrypted portions can include a randomly generated string. For example, the system may generate a string that uniquely identifies the outbound email message. The system may generate the encrypted portion of the message identifier using the secret key and a set of items that are transmitted in at least one encrypted portion of the message identifier. More particularly, the system may encrypt the unencrypted portion or a portion thereof using an encryption algorithm to generate the encrypted portion. The unencrypted portion can include, but is not limited to, the entity identity identifier, an organization identifier, a key identifier, and/or randomly generated string. In other words, the system may encrypt one or more items in unencrypted portion(s) of the message identifier to generate the encrypted portion of the message identifier.

In some implementations, information can be provided in the unencrypted portion(s) of the message identifier for use in identifying the secret key, enabling decryption of the encrypted portion of the message identifier upon retrieval from an inbound reply email message. For example, the unencrypted portion(s) of the message identifier can include the organization identifier and/or key identifier. In other implementations, the secret key may subsequently be retrieved using information that is not transmitted in the message identifier of the outbound email message.

It is important to note that while the organization identifier can be used to retrieve a secret key, the organization identifier need not be included in the message identifier or otherwise transmitted in the outbound email message. Rather, the organization identifier may be ascertained via other mechanisms, such as by performing a lookup in an organization identifier mapping table using a domain or email address. Therefore, to prevent the leak of confidential information, the organization identifier may not be included in the message identifier.

The unencrypted portion can be generated by appending a plurality of items including the set of items in a predefined order. For example, the unencrypted portion can include a message identifier that includes an entity identifier, followed by an organization identifier.

In some implementations, the system generates the encrypted portion such that it is a predefined length. The system may similarly generate the unencrypted portion(s) such that it is a predefined length, which may be the same length as the encrypted portion or may be a different length from the unencrypted portion(s).

In other implementations, the encrypted portion and/or unencrypted portion may be a variable length. The message identifier may be generated such that a delineator including a predefined special character delineates the encrypted portion from the unencrypted portion(s). Individual item(s) in unencrypted portion(s) may similarly be of a predefined length or, alternatively, may be delineated from one another by a delineator that includes a predefined special character. The delineator used to delineate items within unencrypted portion(s) may be the same or different from a delineator used, if any, to separate the encrypted portion from the unencrypted portion(s).

In some implementations, the system generates the message identifier for the outbound email message by calling an application programming interface (API). More particularly, the API may be called by passing an entity identifier, an organization identifier, a key identifier, and/or a randomly generated string as parameters of the API. A message identifier may then be returned via the API.

The system provides the message identifier in message header(s) of the outbound email message at 408 and transmits the outbound email message at 410 to the intended recipient. For example, the message identifier may be provided in a Message-ID header of the outbound email message.

Figure 5:
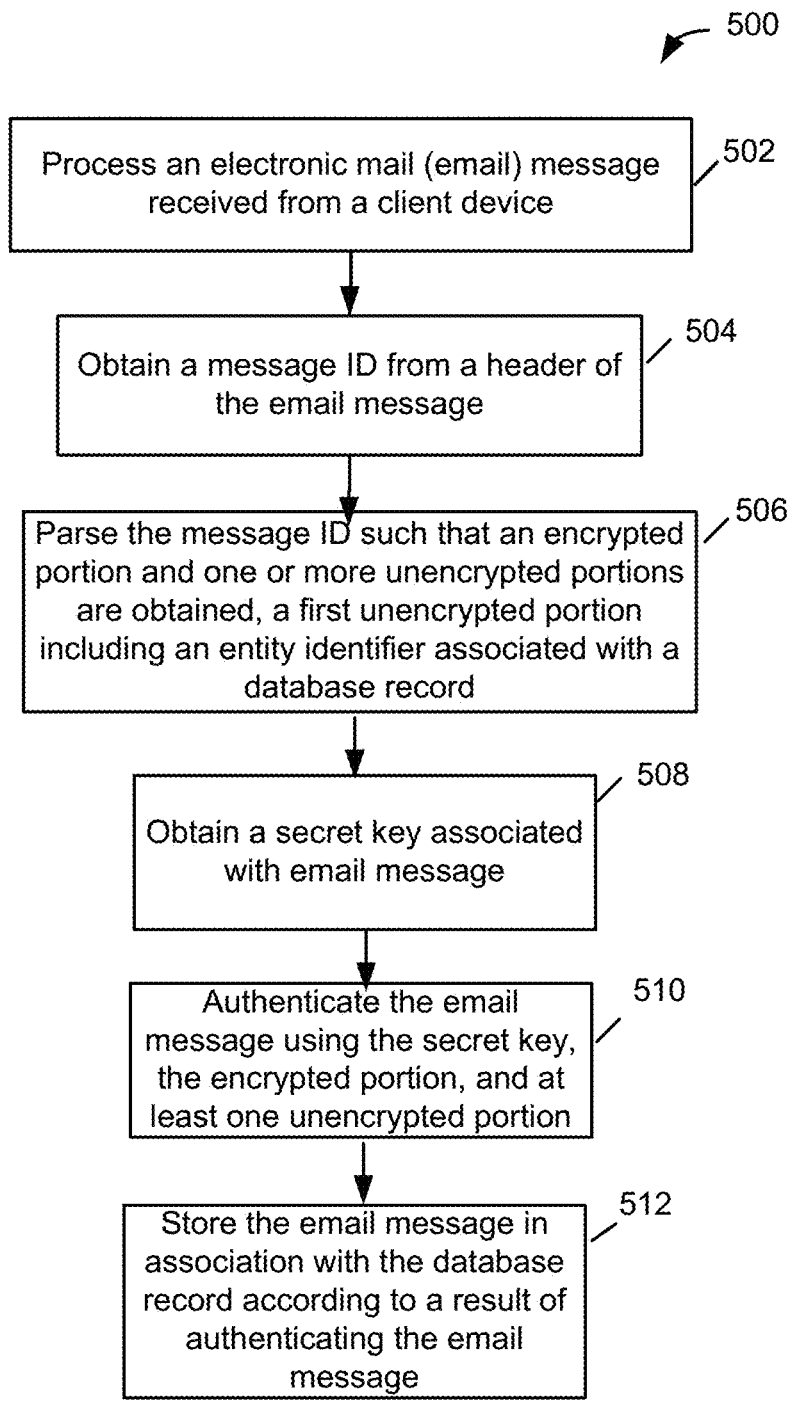
FIG. 5 shows a process flow diagram 500 illustrating an example of a method for processing inbound email messages, in accordance with some implementations.

Upon receiving an inbound email message from a client device in response to the outbound email message, the system processes the inbound email message. FIG. 5 shows a process flow diagram 500 illustrating an example of a method for processing inbound email messages, in accordance with some implementations. As shown in this example, the system processes an inbound email message received via a network from a client device in response to the outbound email message at 502, where the inbound email message has at least one header including a message identifier generated as described herein. For example, the header can include a References header or an In-Reply-To header.

The system obtains the message identifier from the header at 504 and parses the message identifier at 506 such that an encrypted portion and one or more unencrypted portions are obtained, where an unencrypted portion includes an entity identifier associated with a database record of a database. In some implementations, where the unencrypted portion(s) have a predefined length of a specific number of characters, the system parses the message identifier by obtaining a portion of the message identifier having the number of characters. The remaining encrypted portion may be obtained in a similar manner by obtaining a specific number of characters of a predefined length, which may be the same length as the unencrypted portion(s) or may be a different length from the unencrypted portion(s). Alternatively, assuming that the unencrypted portion(s) are in an initial (e.g., leftmost) portion of the message identifier, the encrypted portion may be obtained by identifying the remaining characters of the message identifier preceding the "@" character.

In other implementations, a delineator present in the message identifier is used to facilitate parsing the message identifier. More particularly, the system may parse the message identifier, for example, by sequentially retrieving individual characters from the message identifier (e.g., from left to right) until a delineator is recognized. This process may be performed, for example, to obtain the unencrypted portion(s) delineated from the encrypted portion by the delineator.

In some implementations, the system parses the message identifier or unencrypted portion(s) to obtain individual item(s) such as an entity identifier, organization identifier, key identifier, and/or string. More particularly, the system may obtain a sequence of characters having a length of a predefined number of characters. For example, the predefined number of characters may correspond to a particular item type (e.g., entity identifier type, organization identifier type, key identifier type, or string type). Alternatively, the system may parse the message identifier or unencrypted portion(s) to obtain individual item(s) by retrieving a sequence of characters delineated by a particular delineator including a special character. As described above, a delineator used to delineate items within unencrypted portion(s) of the message identifier may be the same or different from a delineator used (if any) to delineate the encrypted portion of the message identifier form the unencrypted portion(s).

The system obtains a secret key associated with the inbound email message at 508. In some implementations, the secret key is associated with the domain, organization identifier, or associated computing system. For example, the secret key may be obtained via a lookup of the organization identifier in a key repository (e.g., database). In other implementations, the secret key is one of multiple secret keys associated with an organization. For example, the system may obtain a key identifier from the unencrypted portion(s) of the message identifier and use the key identifier to look up the pertinent secret key in a key repository.

The system applies a secret key in an attempt to authenticate the inbound email message. The system authenticates the inbound email message using the secret key, the encrypted portion, and at least one unencrypted portion at 510. In some implementations, the system decrypts the encrypted portion using the secret key and compares a result of the decryption with the set of items in the unencrypted portion. In other words, the system may compare a result of the decryption with the unencrypted portion or a portion thereof. If the comparison operation returns a result indicating that the operands are equal, the system determines that authentication is successful. However, if the operands are not equal, the system determines that authentication has failed.

In other implementations, the system encrypts the unencrypted set of items in the unencrypted portion using the secret key and compares a result of the encryption with the encrypted portion. Stated another way, the system may compare a result of the encryption with the encrypted portion. If the comparison operation returns a result indicating that the operands are equal, the system concludes that authentication is successful. Alternatively, if the operands are determined to not be equal, the system concludes that authentication has failed.

In the event that the system determines that authentication has failed, the system may make further attempt(s) to authenticate the inbound email message using one or more additional secret keys, as described herein. Secret keys may be retrieved using information maintained in a database and/or information in the unencrypted portion of the message identifier.

In some implementations, if authentication fails, the system retrieves another secret key associated with the organization. The system applies the subsequently retrieved secret key in a subsequent attempt to authenticate the inbound email. The system may apply currently active secret keys until authentication is successful. In some instances, the system may apply previously active secret keys if application of currently active secret keys is unsuccessful. Therefore, the system may apply one or more secret keys in an attempt to authenticate the inbound email.

In some implementations, authentication of the inbound email message and/or other related processing of the inbound email message can be performed by calling an application programming interface (API). More particularly, the API may be called by passing a message identifier or portion thereof as parameters of the API. For example, the parameters can include an entity identifier, an organization identifier, a key identifier, a string, and/or an encrypted portion of the inbound email message as parameters of the API. The API may return an indication of whether the inbound email message has been successfully authenticated and/or the entity identifier associated with the pertinent database record.

In some implementations, the system may ascertain a confidence level indicating a likelihood that the inbound email message has been generated by a hacker. For example, if the entity identifier is correct but other information in the unencrypted portion is incorrect, this may indicate a system error rather than the generation of the inbound email by a hacker. If the confidence level exceeds a predefined threshold, the system may conclude that the inbound email message is unlikely to have been generated by a hacker. However, if the confidence level does not exceed the predefined threshold, the system may conclude that the inbound email message is likely to have been generated by a hacker.

For example, a computer model may be trained using historical data pertaining to inbound email messages and authentication thereof. The computer model may then be applied to determine the likelihood that the inbound email message is authentic rather than generated by a hacker.

The system may store the inbound email message in association with the database record according to a result of the authentication at 512. More particularly, if authentication is successful, the inbound email message may be stored in association with the database record identified by the entity identifier. For example, the inbound email message may be stored in a field of the database record or otherwise linked to the database record. However, if authentication has failed, the system may discard the inbound email message. Alternatively, if authentication has failed and/or there is a low likelihood that the inbound email message has been generated by a hacker, the system may save the inbound email in a new database record, enabling a representative to review the inbound email message and process it accordingly. For example, the system may create a new case database record and store the inbound email message in association with the new case database record.

In some implementations, in the event that authentication of the inbound email message fails, the system transmits a notification of an authentication failure to one or more individuals. The notification can be transmitted via email or another mechanism.

Upon review of the inbound email message, a user such as a customer service agent may review the inbound email message to determine whether it has been generated by a hacker. The historical data may be updated to include an indication of whether the inbound email message is considered to be generated by a hacker. The computer generated model may subsequently be updated based upon the updated historical data.

In some implementations, selective processing of email messages is performed for outbound and inbound email messages. An example of a selective processing implementation will be described in further detail below with reference to FIGS. 6 and 7.

Figure 6:
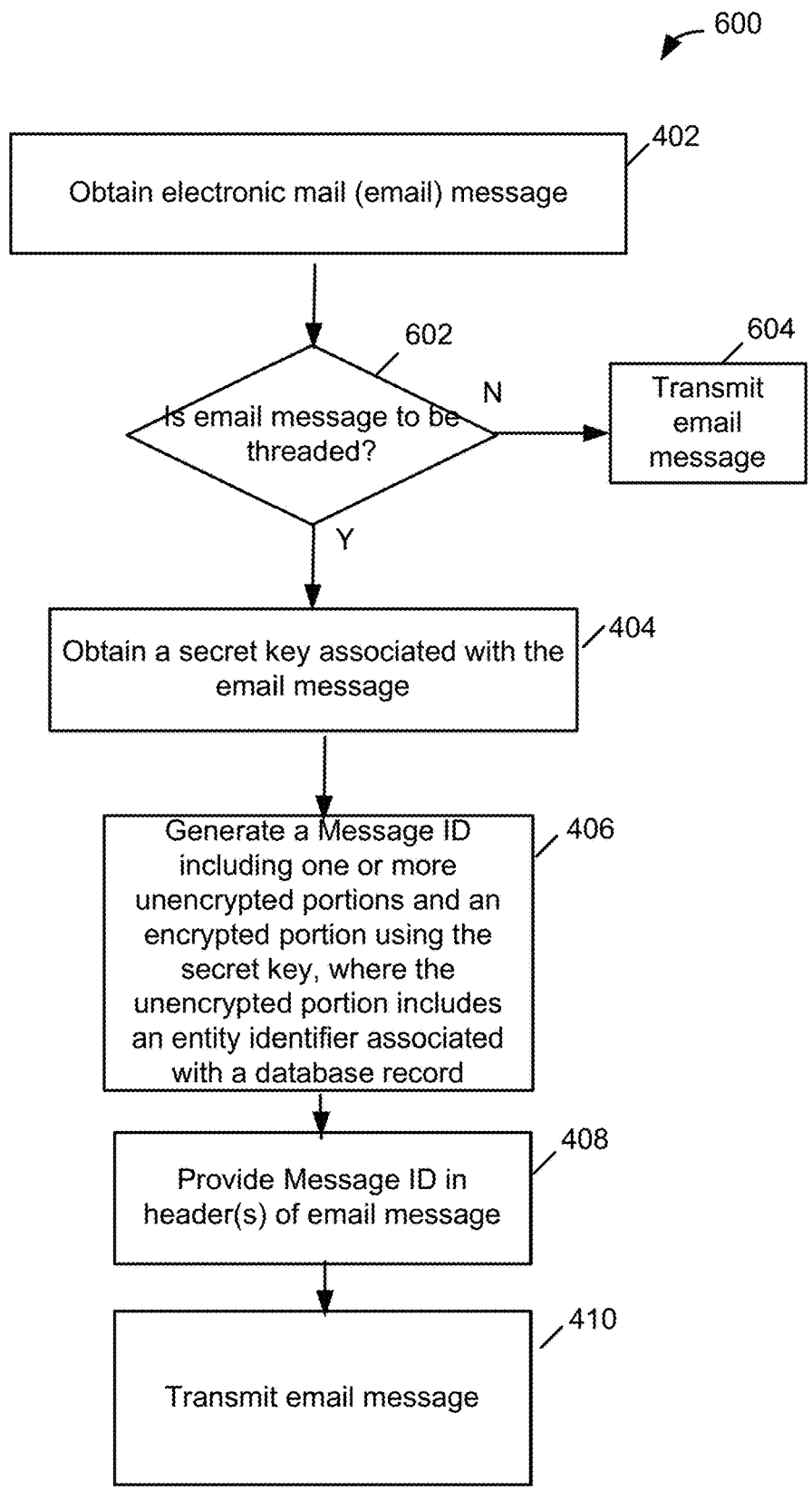
FIG. 6 shows a process flow diagram 600 illustrating an example of a method for selective processing of outbound email messages, in accordance with some implementations.

FIG. 6 shows a process flow diagram 600 illustrating an example of a method for selective processing of outbound email messages, in accordance with some implementations. As shown in this example, after an outbound email message is generated or otherwise obtained at 402, the system may determine whether the outbound email message is to be threaded at 602. In other words, the system may determine whether reply messages transmitted by a client device in response to the outbound email message are to be tracked or recorded in association with a database record corresponding to the outbound email message. More particularly, the system may be configured to thread a specific subset of outbound email messages. For example, the system may be configured to thread outbound email messages that have been automatically generated, manually generated, manually generated by a specific group or individual, or transmitted from a particular email address. As another example, the system may be configured to thread outbound email messages that are addressed to a particular individual, group, company (e.g. domain), or email address. As yet another example, the system may be configured to thread outbound email messages that pertain to a particular subset of database records, a particular type of database record, or a particular type of issue addressed by the outbound email message.

In some implementations, the subset of outbound email messages for which threading is to be performed can be configured via a graphical user interface (GUI). In other implementations, a user (e.g., agent) composing an outbound email message can indicate that threading is to be performed for the outbound email message by selecting a threading option via a GUI.

If the system determines that the outbound email message is not to be threaded, the system proceeds with transmitting the outbound email message at 604. Alternatively, if the system determines that the outbound email message is to be threaded, the system may proceed with processing the outbound email message at 404, as described above with reference to FIG. 4.

Figure 7:
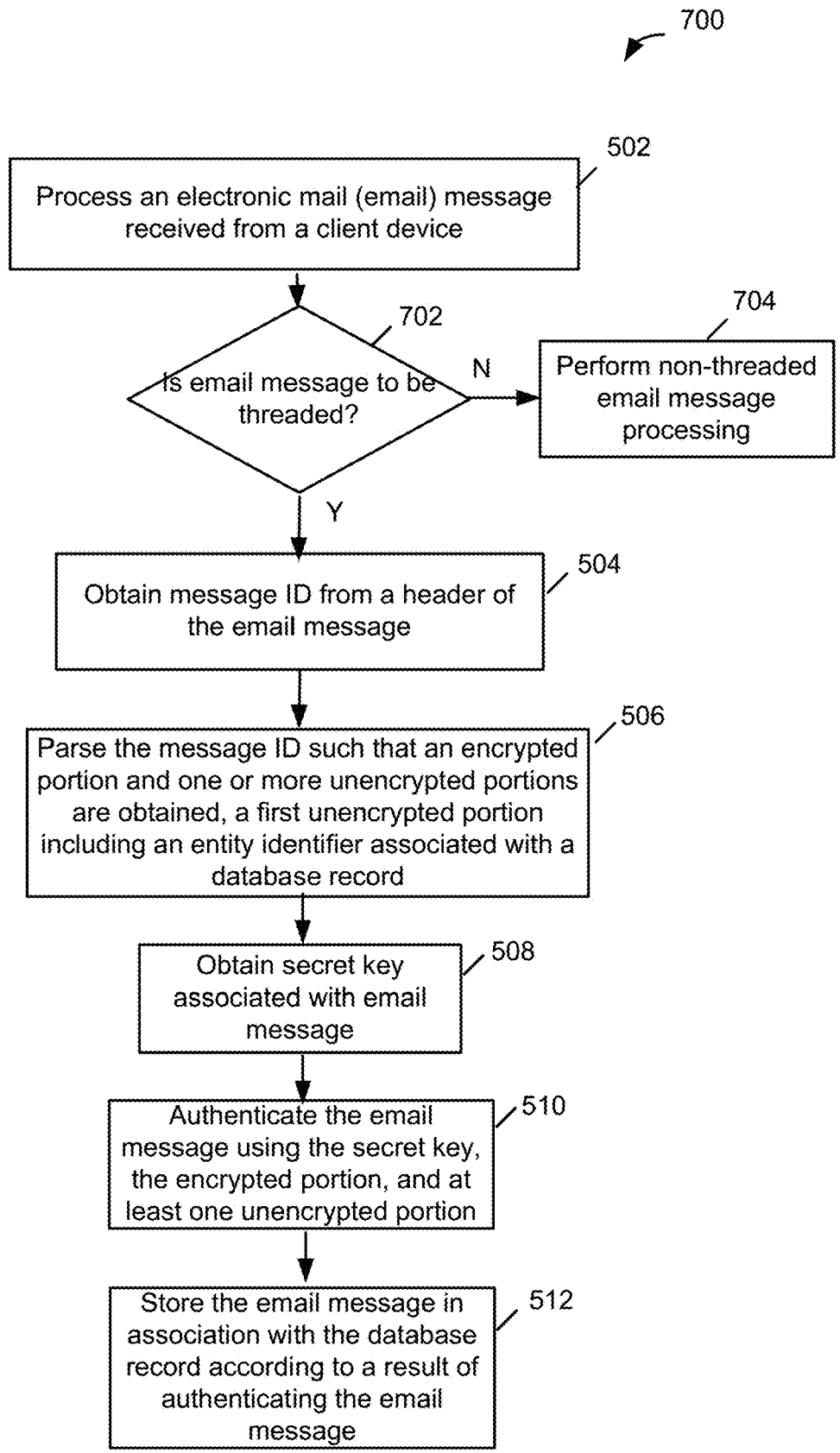
FIG. 7 shows a process flow diagram 700 illustrating an example of a method for selective processing of inbound email messages, in accordance with some implementations.

FIG. 7 shows a process flow diagram 700 illustrating an example of a method for selective processing of inbound email messages, in accordance with some implementations. As shown in this example, after an inbound email message is received or otherwise obtained at 502, the system may determine whether the inbound email message is to be threaded at 702. In other words, the system determines whether reply messages transmitted by a client device in response to a corresponding outbound email message are to be tracked or recorded in association with a database record associated with the corresponding outbound email message. Stated another way, the system determines whether to perform an authentication process such as that described herein on the inbound email message. For example, the system may be configured to thread inbound email messages that are addressed to a specific group, individual, or email address. As another example, the system may be configured to thread inbound email messages that are received from a particular domain, group, individual, or email address.

If the system determines that the inbound email message is not to be threaded, the system proceeds with performing non-threaded email message processing of the inbound email message at 704. For example, the system may route the inbound email message to the intended recipient without performing authentication of a message identifier (if any), as described herein.

Alternatively, if the system determines that the inbound email message is to be threaded, the system proceeds with processing the inbound email message at 504, as described above with reference to FIG. 5.

In the above description, examples are described with reference to identifiers such as an organization identifier. However, it is important to note that these examples are merely illustrative and other implementations are contemplated. For example, a message identifier may be generated using a tenant identifier associated with a tenant of a multi-tenant database instead of an organization identifier.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
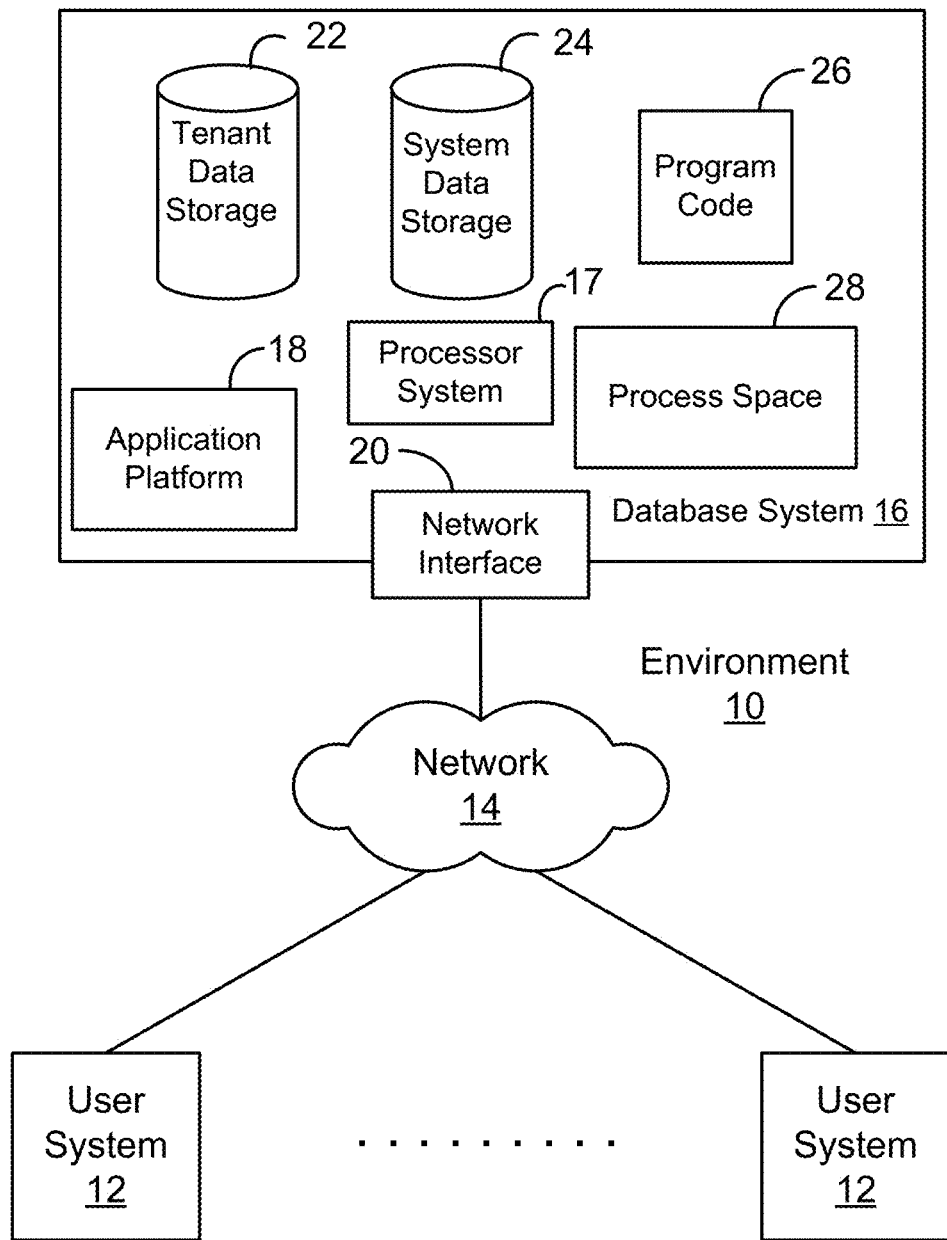
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data, however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen. LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP. HTTP, HTTPS, Ethernet, etc.) as are well known. It will also be appreciated that computer code for the disclosed implementations can be realized in any programming language that can be executed on a client system and/or server or server system such as, for example, C, C++. HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
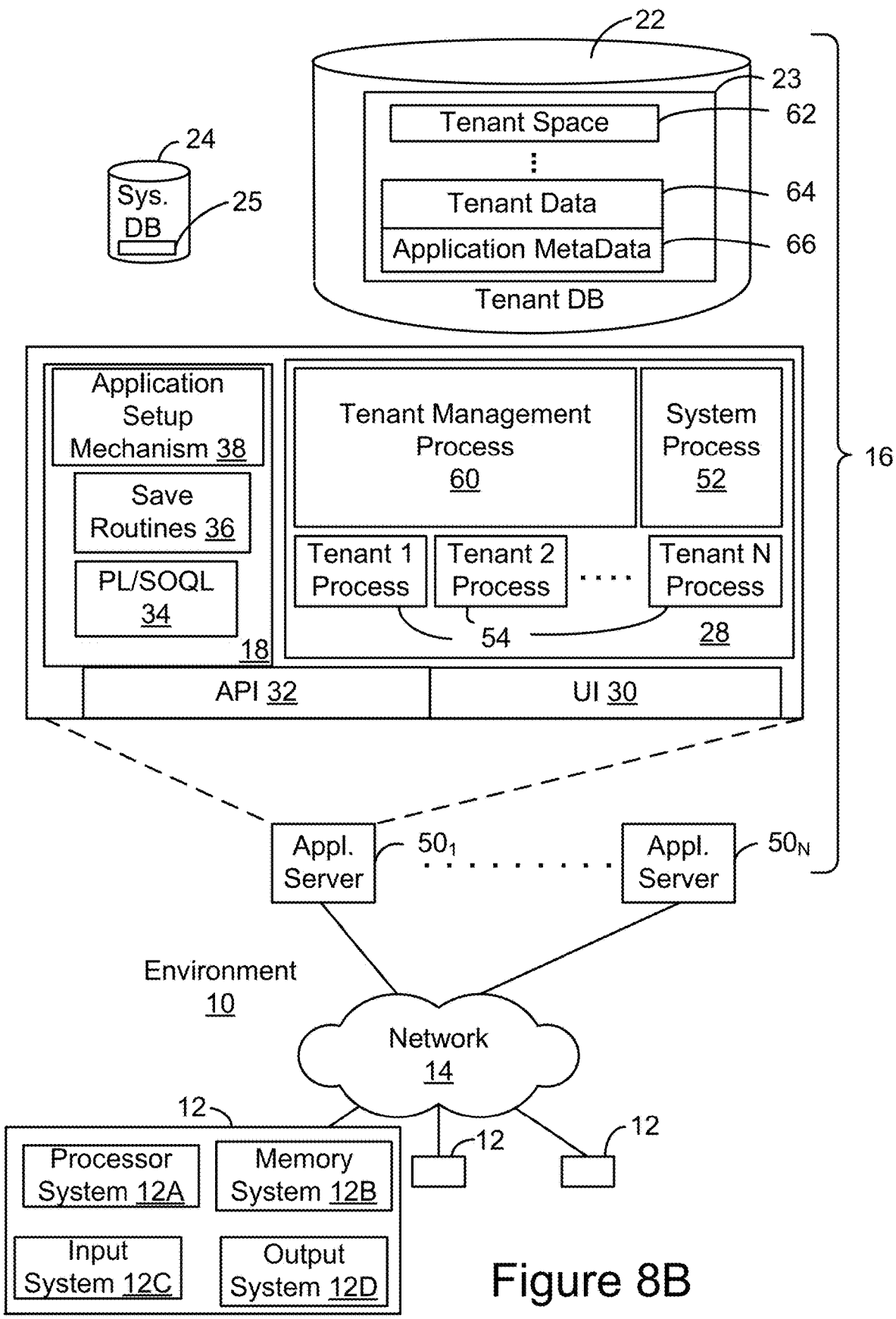
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30. Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
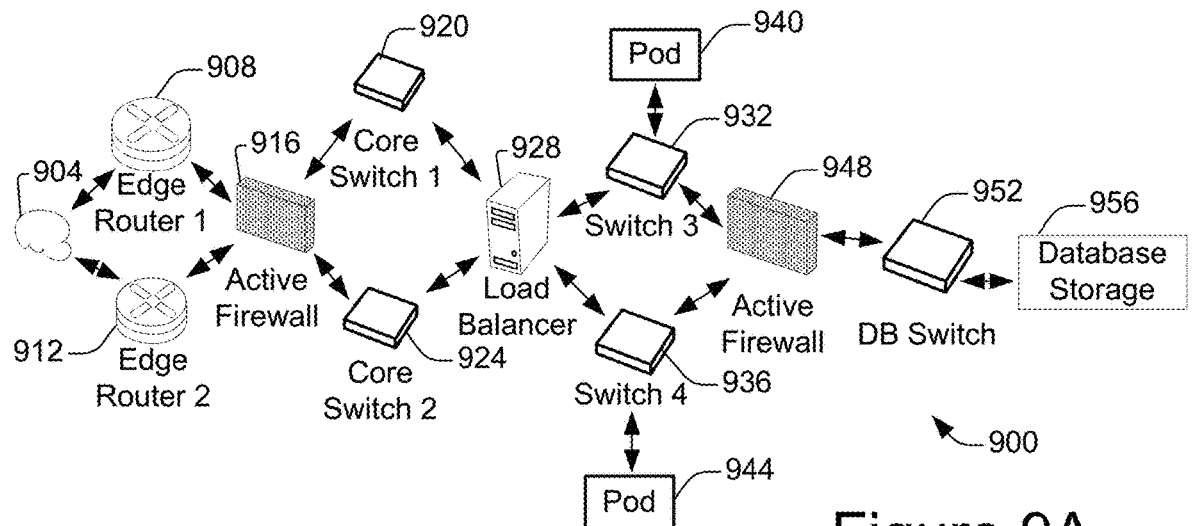
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

Figure 9B:
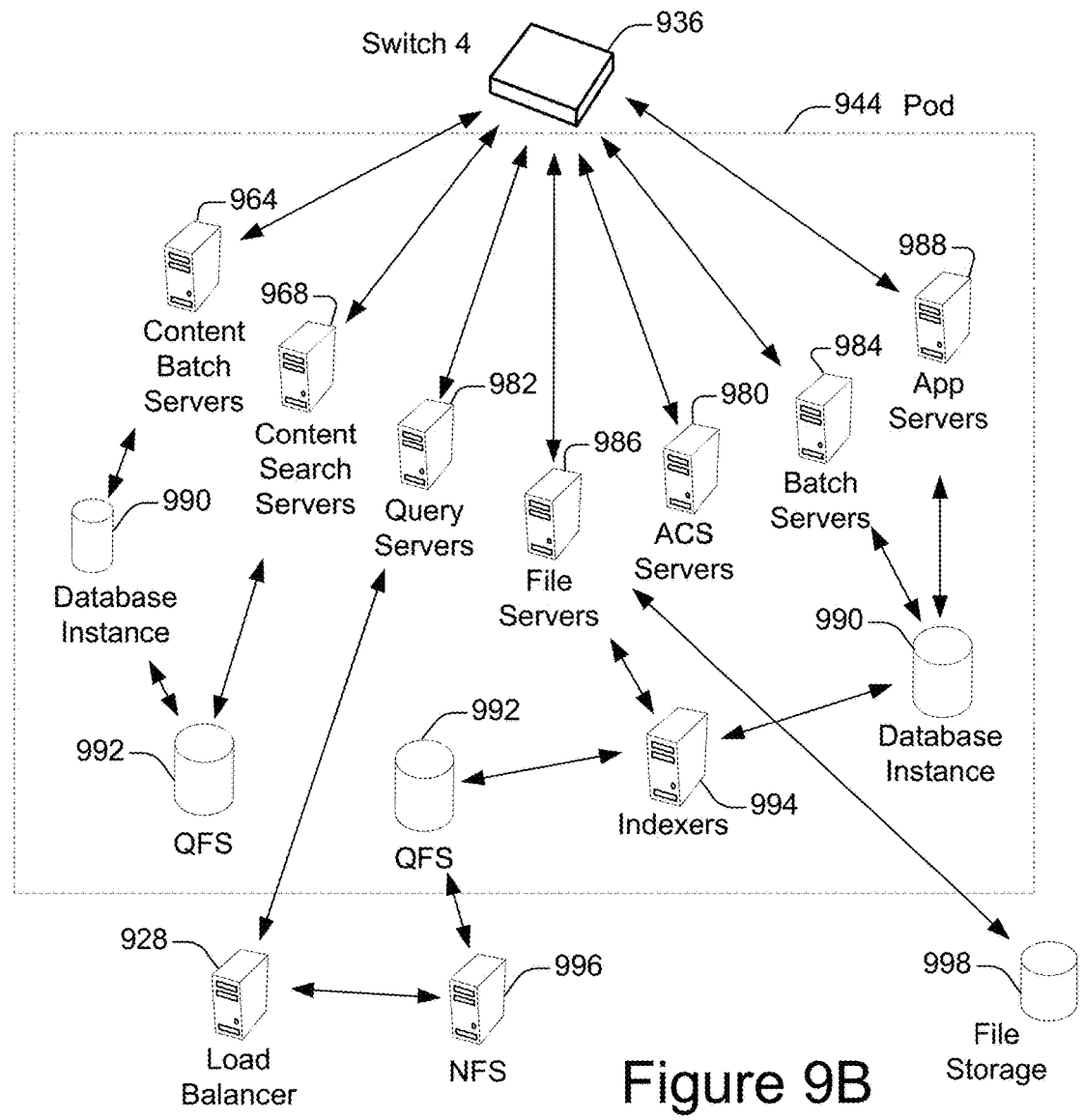
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media: and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example. Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system including at least one hardware processor, the database system configurable to cause:
processing a first electronic mail message received via a network from a first client device, the first electronic mail message having a header including a message identifier;
obtaining the message identifier from the header;
parsing the message identifier such that an encrypted portion and one or more unencrypted portions are obtained, a first unencrypted portion of the unencrypted portions including an entity identifier associated with a first entity database record of a database;
obtaining a secret key associated with the first electronic mail message;
authenticating the first electronic mail message using the secret key, the encrypted portion of the message identifier, and at least one unencrypted portion of the unencrypted portions of the message identifier; and
storing the first electronic mail message in association with the first entity database record according to a result of authenticating the first electronic mail message.

2. The system of claim 1, the unencrypted portions further including one or more identifiers, the one or more identifiers including at least one of: an organization identifier or a key identifier.

3. The system of claim 2, the database system further configurable to cause:

obtaining the secret key associated with the first electronic mail message by retrieving the secret key using at least one of the identifiers.

4. The system of claim 1, the database system further configurable to cause;

discarding the first electronic mail message responsive to determining that the first electronic mail message is not successfully authenticated.

5. The system of claim 1, the database system further configurable to cause:

creating a second database record associated with the entity identifier; and associating the first electronic mail message with the second database record.

6. The system of claim 1, the database system further configurable to cause:

authenticating the first electronic message by calling an application programming interface (API).

7. The system of claim 1, the database system further configurable to cause:

ascertaining whether to perform authentication for the first electronic mail message.

8. A method, comprising:

processing a first electronic mail message received via a network from a first client device, the first electronic mail message having a header including a message identifier;

obtaining the message identifier from the header;

parsing the message identifier such that an encrypted portion and one or more unencrypted portions are obtained, a first unencrypted portion of the unencrypted portions including an entity identifier associated with a first entity database record of a database;

obtaining a secret key associated with the first electronic mail message;

authenticating the first electronic mail message using the secret key, the encrypted portion of the message identifier, and at least one unencrypted portion of the unencrypted portions of the message identifier; and storing the first electronic mail message in association with the first entity database record according to a result of authenticating the first electronic mail message.

9. The method of claim 8, the unencrypted portions further including one or more identifiers, the one or more identifiers including at least one of: an organization identifier or a key identifier.

10. The method of claim 9, further comprising:

obtaining the secret key associated with the first electronic mail message by retrieving the secret key using at least one of the identifiers.

11. The method of claim 8, further comprising:

discarding the first electronic mail message responsive to determining that the first electronic mail message is not successfully authenticated.

12. The method of claim 8, further comprising:

creating a second database record associated with the entity identifier; and associating the first electronic mail message with the second database record.

13. The method of claim 8, further comprising:

authenticating the first electronic message by calling an application programming interface (API).

14. The method of claim 8, further comprising:

ascertaining whether to perform authentication for the first electronic mail message.

15. The method of claim 8, the database being part of a Customer Relationship Management (CRM) system.

16. A non-transitory machine-readable storage medium having computer program instructions stored therein, the computer program instructions configured such that, when executed by one or more processors, the computer program instructions cause the one or more processors to:

process a first electronic mail message received via a network from a first client device, the first electronic mail message having a header including a message identifier;

obtain the message identifier from the header;

parse the message identifier such that an encrypted portion and one or more unencrypted portions are obtained, a first unencrypted portion of the unencrypted portions including an entity identifier associated with a first entity database record of a database;

obtain a secret key associated with the first electronic mail message;

authenticate the first electronic mail message using the secret key, the encrypted portion of the message identifier, and at least one unencrypted portion of the unencrypted portions of the message identifier; and store the first electronic mail message in association with the first entity database record according to a result of authenticating the first electronic mail message.

17. The non-transitory machine-readable medium of claim 16, the unencrypted portions further including one or more identifiers, the one or more identifiers including at least one of: an organization identifier or a key identifier.

18. The non-transitory machine-readable medium of claim 17, wherein the computer program instructions are further configured to cause the one or more processors to:

obtain the secret key associated with the first electronic mail message by retrieving the secret key using at least one of the identifiers.

19. The non-transitory machine-readable medium of claim 16, wherein the computer program instructions are further configured to cause the one or more processors to:

discard the first electronic mail message responsive to determining that the first electronic mail message is not successfully authenticated.

20. The non-transitory machine-readable medium of claim 16, wherein the computer program instructions are further configured to cause the one or more processors to:

create a second database record associated with the entity identifier; and associate the first electronic mail message with the second database record.

\* \* \* \* \*